United States Patent [19]

Yoshida et al.

[11] Patent Number: 4,944,577
[45] Date of Patent: Jul. 31, 1990

[54] LIQUID CRYSTAL DISPLAY DEVICE

[75] Inventors: Tetsushi Yoshida; Ken Kozima, both of Tokyo, Japan

[73] Assignee: Casio Computer Co., Ltd., Tokyo, Japan

[21] Appl. No.: 258,176

[22] Filed: Oct. 14, 1988

[30] Foreign Application Priority Data

Oct. 19, 1987 [JP] Japan .................. 62-263146

[51] Int. Cl.$^5$ .............................. G02F 1/13
[52] U.S. Cl. ................. 350/346; 350/347 V; 350/347 E; 350/350 R
[58] Field of Search ............... 350/346, 347 R, 347 V, 350/340, 341, 350 R, 347 E

[56] References Cited

U.S. PATENT DOCUMENTS

| 4,579,425 | 4/1986 | Ishii et al. .................. 350/346 |
| 4,643,841 | 2/1987 | Ishii et al. .................. 252/299.61 |
| 4,693,562 | 9/1987 | Hasegawa et al. .......... 350/346 X |
| 4,721,366 | 1/1988 | Nosher ..................... 350/347 R X |
| 4,799,774 | 1/1989 | Baur et al. ................. 350/350 R |

FOREIGN PATENT DOCUMENTS

| EP174541 | 8/1985 | European Pat. Off. . |
| EP151446 | 3/1986 | European Pat. Off. . |
| 60-55078 | 3/1985 | Japan . |
| 61-84626 | 4/1986 | Japan . |
| 62-220577 | 9/1987 | Japan . |
| WO87/05174 | 9/1987 | PCT Int'l Appl. . |

OTHER PUBLICATIONS

G. Baur, "The Influence of Material and Device Parameters on the Optical Characteristics of Liquid Crystal Displays", Mol. Cryst. Liq. Cryst., 1981, vol. 63, pp. 45–58.

Shibata et al., "The Effects of Material Constants and Device Parameters on Electrooptic Characteristics of Liquid Crystal Devices", Mol. Cryst. Liq. Cryst., 1984, vol. 108, pp. 339–348.

Primary Examiner—Andrew J. James
Assistant Examiner—Anita Pollman Gross
Attorney, Agent, or Firm—Frishauf, Holtz, Goodman & Woodward

[57] ABSTRACT

A liquid crystal display device of this invention includes a pair of opposing substrates, a plurality of electrodes arranged on the inner surfaces of the pair of opposing substrates so as to oppose each other, aligning films formed on the inner surfaces of the pair of substrates on which the plurality of electrodes are formed, a nematic liquid crystal sealed between the pair of opposing substrates, and a pair of polarizing plates arranged to sandwich the nematic liquid crystal. The nematic liquid crystal has a value of dielectric ratio $\Delta\epsilon/\epsilon_\perp$ of 0.5 or less, a value of elastic constant ratio $K_{33}/K_{11}$ of 0.8 or less, and values of liquid crystal layer thickness d and optical anisotropy $\Delta n$ with which a value of product $\Delta n \cdot d$ of the liquid crystal layer thickness d and optical anisotropy $\Delta n$ becomes 0.5 ($\mu$m) or more and 0.7 ($\mu$m) or less.

19 Claims, 4 Drawing Sheets

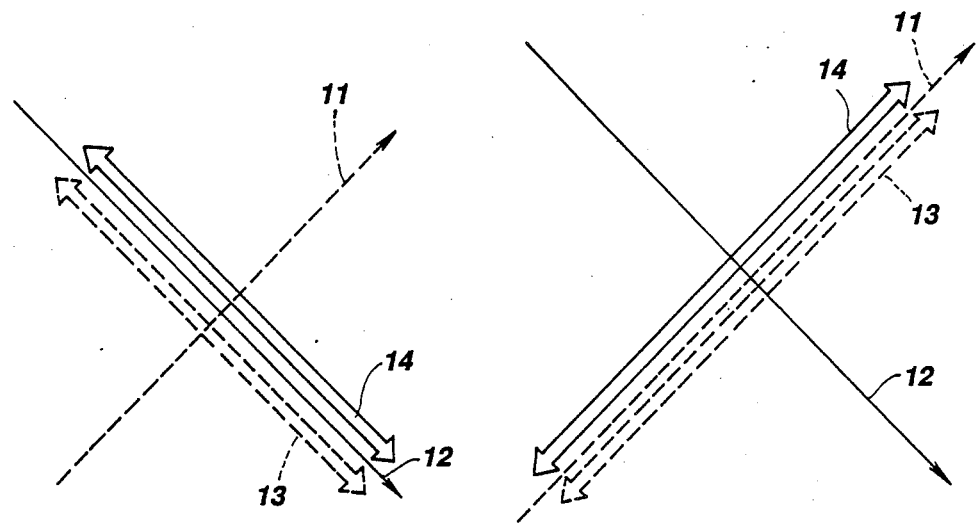
FIG. 4A　　FIG. 4B
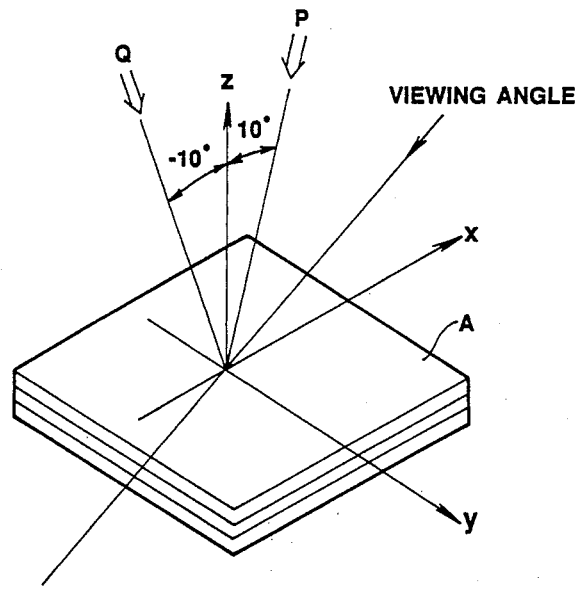
FIG. 5

LIQUID CRYSTAL DISPLAY DEVICE

BACKGROUND OF THE INVENTION

1. Field of the Invention

The present invention relates to a multiplex drive liquid crystal display device using a field effect type twisted nematic effect.

2. Description of the Related Art

A liquid crystal display apparatus having a plurality of pixels arranged in a matrix manner is applied to a display unit of a computer terminal, an image display unit of a television receiver, and the like. Recently, a demand has arisen for a large size and high image quality of the image display unit. Therefore, an increase in number of pixels and an improvement in contrast are desired. A liquid crystal display apparatus applied to the image display unit has a simple matrix type twisted nematic liquid crystal display device (to be referred to as a matrix TN. LC. device) arranged such that a plurality of electrodes are aligned on inner surfaces of a pair of opposing substrates and opposing portions of the electrodes form a plurality of pixels aligned in a matrix manner. The matrix TN. LC. device is driven in a multiplexed manner.

In the matrix TN. LC. device, if the number of pixels is increased in order to improve the resolution and increase a display area, the number of scanning lines is naturally increased. Therefore, high multiplex drive must be performed. However, if a multiplexing degree is increased, a difference in effective voltages between an on electric field to be applied to a liquid crystal to turn on pixels and an off electric field to be applied to the liquid crystal to turn off the pixels is reduced. As a result, an operating margin of a drive voltage is reduced, the contrast is lowered, and a viewing angle characteristic is degraded.

The operating margin and the contrast of a liquid crystal display device depend on a voltage-luminance characteristic. That is, when a change in transmittivity with respect to a change in intensity of the electric field to be applied to the liquid crystal is steep, the operating margin can be increased, and the contrast can be increased. As shown in FIG. 1, the steepness of the voltage-luminance characteristic is represented by a ratio (to be referred to as $\gamma$ value hereinafter) between voltage $V_{50}$ at which the transmittivity is 50% and threshold voltage $V_C$. When the $\gamma$ value becomes closer to 1, the change in transmittivity becomes steeper. Therefore, the operating margin can be increased, and the contrast can be increased.

In addition, in the matrix TN. LC. device which is of high multiplex drive type, a multiplexing degree is increased, and one selection period is shortened. Therefore, the matrix TN. LC. device must respond at high speed.

As described above, the matrix TN. LC. device of high multiplex degree must have:

(1) a $\gamma$ characteristic close to 1;
(2) a wide viewing angle; and
(3) a high response speed.

The $\gamma$ characteristic is studied by M. Schadt et al. According to their studies, the $\gamma$ value representing the steepness of the voltage-luminance characteristic is given by the following equation (I) and coincides well with the characteristic of an actual device:

$$\gamma = V_{50}/V_C = [2.044 - 1.044/(1 + K_{33}/K_{11})] \cdot \quad (I)$$

$$\{1 + 0.123[(\Delta\epsilon/\epsilon_\perp)^{0.6} - 1]\} \cdot [1 + 0.132\ln(\Delta n \cdot d/2\lambda)]$$

where $V_{50}$: the applied voltage when a transmittivity of 50% is obtained
$V_C$: the threshold voltage
$K_{11}$: the splay elastic constant of the liquid crystal
$K_{33}$: the bending elastic constant of the liquid crystal
$\Delta\epsilon$: the dielectric anisotropy of the liquid crystal
$\epsilon_\perp$: the dielectric constant in a direction perpendicular to a liquid crystal molecular axis
$\Delta n$: the optical anisotropy of the liquid crystal
d: the liquid crystal layer thickness
$\lambda$: the wavelength of light According to equation (I), it is apparent that when the first, second, and third terms of equation (I) are close to 1 the $\gamma$ value is close to 1. Therefore, in order to improve the $\gamma$ value characteristic, the following conditions must be simultaneously satisfied:

(a) a ratio (to be referred to as elastic constant ratio $K_{33}/K_{11}$ hereinafter) of bending elastic constant $K_{33}$ to splay elastic constant $K_{11}$ is small;

(b) a ratio (to be referred to as dielectric ratio $\Delta\epsilon/\epsilon_\perp$ hereinafter) of dielectric anisotropy $\Delta\epsilon$ to the dielectric constant in a direction perpendicular to the liquid crystal molecular axis, is small; and (c) a value of product $\Delta n \cdot d$ of liquid crystal optical anisotropy $\Delta n$ and liquid crystal layer thickness d is 1.1 ($\mu$m) when a wavelength of incident light is 550 nm.

Dependency (to be referred to as a viewing angle characteristic hereinafter) of the contrast to an observing direction is studied by Mr. G. BAUR and reported in "The Influence of Material and Device Parameters on the Optical Characteristics of Liquid Crystal Displays", Molecular Crystals and Liquid Crystals, Volume 63, Nos. 1 to 4, 1981. According to this report, the viewing angle characteristic of a liquid crystal display device depends on liquid crystal layer thickness d and liquid crystal optical anisotropy $\Delta n$ of a liquid crystal. That is, in a liquid crystal display device having large product $\Delta n \cdot d$ (to be referred to as $\Delta n \cdot d$ hereinafter) of layer thickness d and optical anisotropy $\Delta n$, an apparent change rate of $\Delta n \cdot d$ obtained when the liquid crystal display device is viewed from its front and in an oblique direction is large, resulting in a poor viewing angle characteristic. To the contrary, a liquid crystal display device having small $\Delta n \cdot d$ has a good viewing angle characteristic. In addition, when liquid crystal display devices having equal $\Delta n \cdot d$ are compared, a better viewing angle characteristic is obtained with smaller optical anisotropy $\Delta n$ of the liquid crystal. That is, a better viewing angle characteristic is obtained when a change in contrast with respect to a change in observing direction is small. Therefore, in order to improve the viewing angle characteristic:

(d) $\Delta n \cdot d$ must be reduced; and
(e) $\Delta n$ must be reduced.

As for the response characteristic, response time $t_{ON}$ required for turning on the liquid crystal display device and response time $t_{OFF}$ required for turning off the liquid crystal display device are represented by the following logic equations (II) and (III), respectively, and coincide well with measurement values:

$$t_{ON} = \eta/(\epsilon_0 \Delta\epsilon E^2 - Kq^2) \quad (II)$$

$$t_{OFF} = \eta/Kq^2 \quad \text{(III)}$$

where $q = \pi/d$, $K = K_{11} + [(K_{33} - 2K_{22})/4]$
  $\eta$ : viscosity
  $\epsilon_0$ : dielectric constant in vacuum
  E : electric field intensity
  $K_{22}$ : a twist elastic constant According to equations (II) and (III), the response speed depends on viscosity $\eta$ and electric field intensity E. That is, in order to increase the response speed:

(f) viscosity $\eta$ must be reduced; and
(g) the electric field intensity must be increased.

Of the above conditions (a) to (c) for obtaining a steep $\gamma$ characteristic, the condition of $\Delta n \cdot d$ has a largest influence on the $\gamma$ characteristic. Therefore, in consideration of the above technical background, a value of $\Delta n \cdot d$ of a conventional matrix TN. LC. device is set to be about 1.1 ($\mu$m) because the center of a wavelength range of a visual light beam is about 550 nm. In this case, since optical anisotropy $\Delta n$ of a liquid crystal generally falls within the range of 0.13 to 0.16, liquid crystal layer thickness (interelectrode gap) d is set to fall within the range of 7.0 to 8.5 ($\mu$m).

The above conventional liquid crystal display device has a $\Delta n \cdot d$ value of 1.1 and therefore has a relatively high contrast. However, the contrast is not sufficient yet. In addition, since the value of $\Delta n \cdot d$ is large, the viewing angle characteristic is poor, and the response speed is low because liquid crystal layer thickness d is increased. If thickness d is reduced in order to increase the response speed, the value of $\Delta n$ must be increased to be 0.147 or more to satisfy the condition of $\Delta n \cdot d$ for obtaining a high contrast. In this case, however, the viewing angle characteristic is further degraded because the value of $\Delta n$ is large. If the values of thickness d and $\Delta n$ are reduced in order to improve the viewing angle characteristic and the response speed, the value of $\Delta n \cdot d$ largely becomes different from an optimal value of 1.1, and the contrast is significantly lowered. Therefore, a high contrast, a wide viewing angle, and a high-speed response cannot be satisfied.

As described above, according to the conventional liquid crystal display device, it is difficult to obtain an image display with sufficiently high contrast and to satisfy above conditions (1) to (3) required for the matrix TN. LC. device of high multiplex drive type. As a result, an image display cannot be obtained with sufficiently high display quality.

SUMMARY OF THE INVENTION

The present invention has been made in consideration of the above situation and has as its object to provide a liquid crystal display device which can display an image with high contrast.

It is another object of the present invention to provide a liquid crystal display device which satisfies all of a high contrast, a wide viewing angle, and a high response speed and is suitable for high multiplex drive.

In order to achieve the above objects, a liquid crystal display device according to the present invention comprises:
  a pair of opposing substrates;
  a plurality of electrodes arranged on opposing inner surfaces of the pair of substrates so as to oppose each other;
  aligning films formed on the inner surfaces of the pair of substrates on which the plurality of electrodes are formed, and oriented in a predetermined direction;
  a nematic liquid crystal, interposed between the opposing electrodes formed on the pair of opposing substrates, and having a value of dielectric ratio $\Delta\epsilon/\epsilon_\perp$ of 0.5 or less which is a ratio of dielectric anisotropy $\Delta\epsilon$ to dielectric constant $\epsilon_\perp$ in a direction perpendicular to a liquid crystal molecular axis direction and a value of elastic constant ratio $K_{33}/K_{11}$ of 0.8 or less which is a ratio of bending elastic constant $K_{33}$ to splay elastic constant $K_{11}$; and
  a pair of polarizing plates arranged to sandwich the nematic liquid crystal.

The liquid crystal display device of the present invention having the above arrangement employs a nematic liquid crystal having very small dielectric ratio $\Delta\epsilon/\epsilon_\perp$ and elastic constant ratio $K_{33}/K_{11}$ as a liquid crystal. The values of dielectric ratio $\Delta\epsilon/\epsilon_\perp$ and elastic constant ratio $K_{33}/K_{11}$ are much smaller than $\Delta\epsilon/\epsilon_\perp = 1.0$ or more and $K_{33}/K_{11} = 1.2$ to 1.3 of a conventional liquid crystal composition. The liquid crystal display device of the present invention obtained by interposing the liquid crystal composition having very small dielectric ratio $\Delta\epsilon/\epsilon_\perp$ and elastic constant ratio $K_{33}/K_{11}$ between the electrodes has an improved $\gamma$ characteristic and a high contrast.

In addition, equation (I) representing the $\gamma$ characteristic is not applicable to the liquid crystal display device of the present invention. That is, an optimal $\gamma$ characteristic is obtained under conditions different from conditions (a), (b), and (c) for optimizing the $\gamma$ characteristic.

More specifically, when a liquid crystal display device employs a liquid crystal composition having dielectric ratio $\Delta\epsilon/\epsilon_\perp$ of 0.5 or less and elastic constant ratio $K_{33}/K_{11}$ of 0.8 or less, a value of $\Delta n \cdot d$ for optimizing the contrast obtained when the device is viewed from its front falls within the range of 0.50 ($\mu$m) to 0.70 ($\mu$m), preferably, 0.54 to 0.70, and more preferably, 0.54 to 0.65. As described above, according to the liquid crystal display device of the present invention, the values of dielectric ratio $\Delta\epsilon/\epsilon_\perp$ and elastic constant ratio $K_{33}/K_{11}$ are very small. Therefore, a high contrast can be obtained with small $\Delta n \cdot d$. In addition, since liquid crystal layer thickness d can be reduced, a high response speed can be obtained. Furthermore, since $\Delta n$ and $\Delta n \cdot d$ are small, the viewing angle characteristic can be improved.

As a result, electrooptical characteristics of the liquid crystal display device which is driven by high multiplex drive can be improved.

In the present invention, it is preferable that the values of elastic constant ratio $K_{33}/K_{11}$ and dielectric ratio $\Delta\epsilon/\epsilon_\perp$ are minimized. More specifically, the value of dielectric ratio $\Delta\epsilon/\epsilon_\perp$ falls within the range of, preferably, 0.1 to 0.5 and, more preferably, 0.2 to 0.4. The value of elastic constant ratio $K_{33}/K_{11}$ is larger than a value which can be realized as a liquid crystal composition and smaller than 0.8, e.g., falls within the range of 0.2 to 0.8 or 0.4 to 0.8. Liquid crystal layer thickness d is set within the range of, preferably, 4.0 $\mu$m to 8.0 $\mu$m and, more preferably, 4.0 $\mu$m to 7.0 $\mu$m.

When $\Delta n \cdot d$ is set within the range of 0.54 $\mu$m to 0.70 $\mu$m, layer thickness d is set within the range of, preferably, 4.0 $\mu$m to 7.0 $\mu$m, and more preferably, 6 $\mu$m or less. Liquid crystal optical anisotropy $\Delta n$, which meets the mentioned condition of $\Delta n \cdot d$, is set within the range of, preferably, 0.08 to 0.14 and, more preferably, 0.12 or less.

BRIEF DESCRIPTION OF THE DRAWINGS

FIGS. 4A and 4B are views for explaining a relationship between an oriented direction of an aligning film and a direction of a polarizing axis of a polarizing plate in the liquid crystal display device of the present invention;

FIG. 5 is a perspective view showing definition of a viewing angle characteristic.

DETAILED DESCRIPTION OF THE PREFERRED EMBODIMENTS

The present invention will be described in detail below by way of its examples. A matrix TN. LC. device of the present invention will be described with reference to the accompanying drawings.

Figure 1:
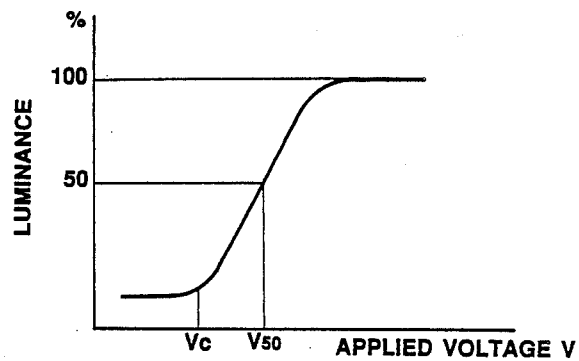
FIG. 1 is a graph showing a luminance-voltage characteristic for defining a γ characteristic of a liquid crystal display device.
Figure 2:
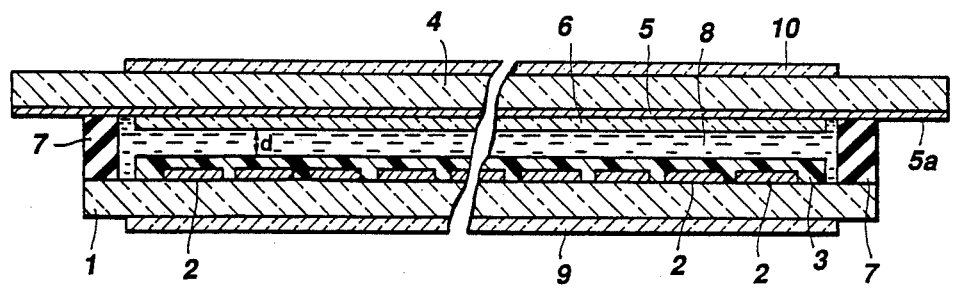
FIG. 2 is a sectional view showing an embodiment of the present invention.
Figure 3:
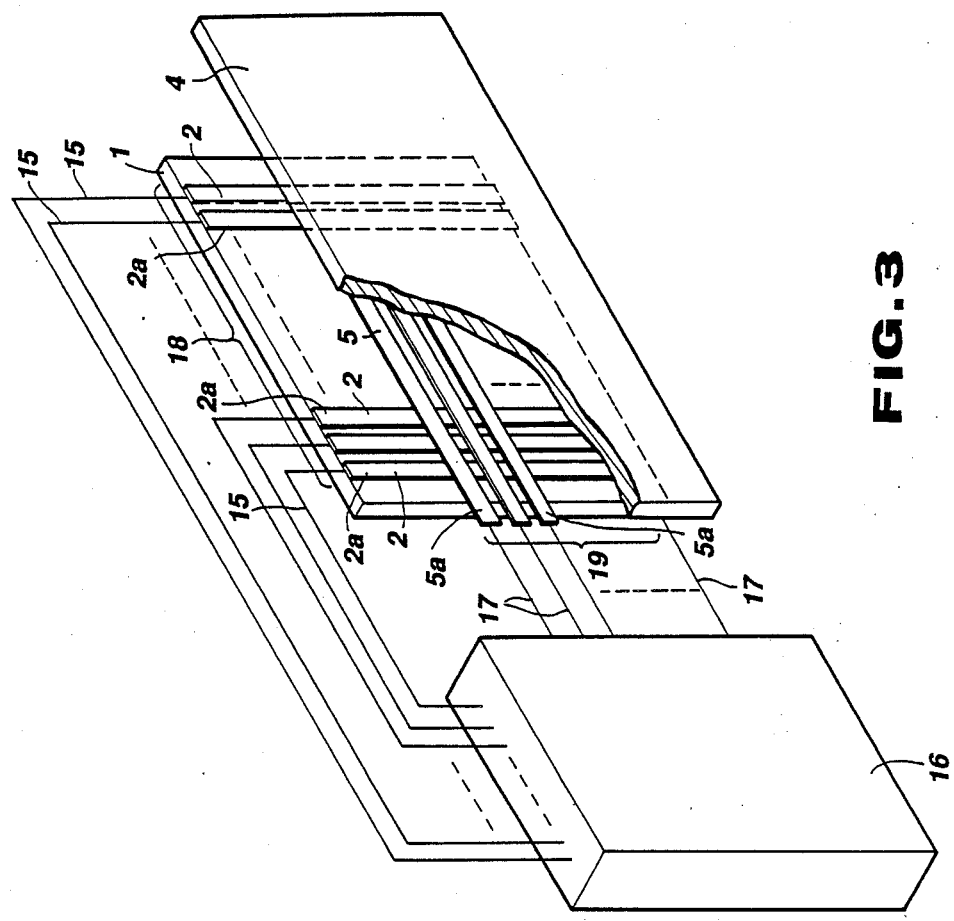
FIG. 3 is an exploded perspective view showing a schematic structure of the liquid crystal display device of the present invention.

In FIGS. 2 and 3, a plurality of first electrodes 2 which vertically extend in FIG. 3 are arranged on lower substrate 1 consisting of a transparent glass plate or an optically isotropic plastic plate. Aligning film 3 which is subjected to an aligning treatment is formed to cover the substrate surface on which electrodes 2 are arranged. A plurality of second electrodes 5 which extend in a transverse direction in FIG. 3 are arranged on upper substrate 4 consisting of a material similar to that of lower substrate 1. Aligning film 6 which is subjected to an aligning treatment is formed to cover the substrate surface on which second electrodes 5 are arranged. Lower and upper substrates 1 and 4 oppose each other with a predetermined gap therebetween such that the surfaces on which first and second electrodes 2 and 5 are formed face inward and are adhered by sealing member 7. Nematic liquid crystal 8 to be described below is sealed between substrates 1 and 4. Nematic liquid crystal 8 forms a liquid crystal layer having thickness d between first and second electrodes 2 and 5. A pair of polarizing plates 9 and 10 are arranged on the outer surfaces of substrates 1 and 4, respectively.

FIGS. 4a and 4B show an oriented direction of aligning films 3 and 6 and a direction of polarizing axis of polarizing plates 9 and 10. Films 3 and 6 formed on the electrode-formed surfaces of lower and upper substrates 1 and 4 are rubbed as shown in FIG. 4A. That is, film 3 on substrate 1 is rubbed in oriented direction 11 indicated by a broken arrow, and film 6 on substrate 4 is rubbed in oriented direction 12 indicated by a solid arrow which crosses direction 11 at substantially 90°. In this manner, nematic liquid crystal 8 sealed between substrates 1 and 4 rubbed in directions different by substantially 90° is subjected to twisted orientation in which liquid crystal molecules are twisted through substantially 90°. As shown in FIG. 4A, polarizing axis 13 (indicated by the broken arrow) of lower polarizing plate 9 and polarizing axis 14 (indicated by the solid arrow) of upper polarizing plate 10 are substantially parallel to each other and to direction 12 of film 6 formed on substrate 4. Note that as shown in FIG. 4B, polarizing axis 13 of plate 9 and polarizing axis 14 of plate 10 may be substantially parallel to each other and to direction 11 of film 3 formed on substrate 1.

As shown in FIG. 3, in the above liquid crystal display device, terminals 2a of first electrodes 2 extending from an end portion of lower substrate 1 are connected to driver 16 through lead lines 15, and terminals 5a of second electrodes 5 extending from an end portion of upper substrate 4 are connected to driver 16 through lead lines 17. In the liquid crystal display device having the above arrangement, electrodes 2 formed on substrate 1 constitute column electrode 18, and electrodes 5 formed on substrate 4 constitute row electrode 19. Each portion at which column electrode 18 crosses row electrode 19 through the nematic liquid crystal forms a pixel. A scanning signal for applying a voltage sequentially to electrodes 5 is supplied from driver 16 to row electrode 19, and a data signal corresponding to image data is supplied to electrodes 2 of column electrode 18 in synchronism with the scanning signal. In this manner, an electric field is applied to the nematic liquid crystal at the portion at which row electrode 19 crosses column electrode 18 to activate liquid crystal molecules, thereby controlling an on/off state of each pixel. That is, this liquid crystal display device is driven in a multiplex manner.

The liquid crystal display device of the present invention employs, as a nematic liquid crystal, a liquid crystal composition in which ratio $\Delta\epsilon/\epsilon_\perp$ of dielectric anisotropy $\Delta\epsilon$ to dielectric constant $\Delta_\perp$ in a direction perpendicular to a liquid crystal molecular axis is 0.5 or less and ratio $K_{33}/K_{11}$ of bending elastic constant $K_{33}$ to splay elastic constant $K_{11}$ is 0.8 or less. A value of product Δn·d of liquid crystal layer thickness d and optical anisotropy Δn is from 0.54 to 0.7. That is, in the liquid crystal display device having small dielectric ratio $\Delta\epsilon/\epsilon_\perp$ of the nematic liquid crystal, a change in dielectric constant corresponding to a change in alignment of liquid crystal molecules is small, and a change in equivalent impedance of the liquid crystal is small. Therefore, since the linearity of the electric field to be applied to the liquid crystal with respect to the voltage to be applied between the electrodes is improved, the contrast is improved. The response speed of the liquid crystal display device is represented by equations (II) and (III) described above. In this case, assuming that:

$$V_C = \pi \sqrt{K/\epsilon_0 \Delta\epsilon} \qquad (IV)$$

the following equation (V) is obtained:

$$t_{ON} = \eta_1 d^2 / |^2 K(V^2/V_C^2 - 1) \qquad (V)$$

As is apparent from equations (V) and (III), in the liquid crystal display device of the present invention using the liquid crystal composition in which splay elastic constant $K_{11}$ of the nematic liquid crystal is increased to reduce elastic constant ratio $K_{33}/K_{11}$, both of rise time $t_{ON}$ and decay time $t_{OFF}$ are reduced. Therefore, the liquid crystal display device can respond at high speed. In this manner, equation (I) described above is not applied to the liquid crystal display device using a nematic liquid crystal having small dielectric ratio $\Delta\epsilon/\epsilon_\perp$ and elastic constant ratio $K_{33}/K_{11}$, and a high contrast can be obtained. In addition, in this liquid crystal display device, optimal electrooptical characteristics can be obtained when the value of Δn·d falls within a predetermined range smaller than 1.1. Therefore, since the value of Δn·d is small, the viewing angle characteristic is improved. Furthermore, since the value of d can be reduced, the intensity of the electric field to be applied to the liquid crystal can be increased to increase the response speed.

Electrooptical characteristics of a plurality of liquid crystal display devices of the present invention having the above arrangement were measured. These liquid crystal display devices are examples having different liquid crystal layer thicknesses d and using different liquid crystal compositions. Constituent factors and electrooptical characteristics of the examples are summarized in Table 1. In Table 1, optical anisotropy Δn is a measured value obtained when λ=589 nm. The contrast is a value ($Y_{ON}/Y_{OFF}$) obtained by dividing value $Y_{ON}$ of transmittivity in an ON state in a direction of viewing angle $\theta=10°$ when the device was driven by a drive signal of 1/64 duty by value $Y_{OFF}$ of transmittivity in an OFF state. The temperature during measurement was 25° C. The threshold voltage, viewing angle characteristic, and response speed are measured values obtained when the device was driven by a static drive signal of 1 kHz. Note that above threshold voltage $V_{th}$ is defined as an applied voltage when a transmittivity of 50% is obtained. The response speed is defined as $(T_r+T_D)/2$ assuming that a rise time required for the luminance to reach from 10% to 90% is $T_r$ and a decay time required for the luminance to reach from 90% to 10% is $T_D$. The viewing angle characteristic is defined as $V_{th}(\theta=-10°)/V_{th}(\theta=10°)$ at a temperature of 25° C. assuming that a threshold voltage observed from direction P inclined through 10° from the Z axis perpendicular to the substrate surface of liquid crystal display device A toward a viewing angle direction is $V_{th}(\theta=10°)$ and a threshold voltage observed from direction Q inclined from the Z axis toward a direction opposite to the viewing angle direction is $V_{th}(\theta=-10°)$). Note that the viewing angle characteristic is better when its value is closer to 1, i.e., the viewing angle is wider.

TABLE 1

| | | Example No. | | |
|---|---|---|---|---|
| | | Example 1 | Example 2 | Example 3 |
| Device Constituent Factors | Δn | 0.160 | 0.140 | 0.120 |
| | d[m] | 7.0 | 4.0 | 5.0 |
| | Δn·d | 1.12 | 0.56 | 0.60 |
| | Viscosity [cp] | 21 | 24 | 24 |
| | $\Delta\epsilon/\epsilon_\perp$ | 0.35 | 0.50 | 0.40 |
| | $K_{33}/K_{11}$ | <0.80 | <0.75 | <0.75 |
| Electro-optical Characteristics | Contrast Ratio | 21 | 18 | 20 |
| | Viewing Angle Characteristic | 1.15 | 1.07 | 1.07 |
| | Response Speed [msec] | ≈30 | <25 | ≈25 |
| | Threshold Voltage [V] | 4.5 | 4.0 | 4.3 |

| | | Example No. | | |
|---|---|---|---|---|
| | | Example 4 | Example 5 | Example 6 |
| Device Constituent Factors | Δn | 0.112 | 0.112 | 0.080 |
| | d [μm] | 5.8 | 5.8 | 7.0 |
| | Δn·d | 0.65 | 0.65 | 0.56 |
| | Viscosity [cp] | 24 | 26 | 22 |
| | $\Delta\epsilon/\epsilon_\perp$ | 0.35 | 0.20 | 0.35 |
| | $K_{33}/K_{11}$ | <0.75 | <0.70 | <0.80 |
| Electro-optical Characteristics | Contrast Ratio | 23 | 26 | 21 |
| | Viewing Angle Characteristic | 1.06 | 1.05 | 1.05 |
| | Response Speed [msec] | <30 | ≈30 | ≈30 |
| | Threshold Voltage [V] | 4.5 | 5.5 | 4.5 |

| | | Example No. | | |
|---|---|---|---|---|
| | | Example 7 | Example 8 | Example 9 |
| Device Constituent Factors | Δn | 0.100 | 0.080 | 0.112 |
| | d [m] | 7.0 | 8.0 | 4.8 |
| | Δn·d | 0.70 | 0.64 | 0.54 |
| | Viscosity [cp] | 22 | 22 | 24 |
| | $\Delta\epsilon/\Delta_\perp$ | 0.25 | 0.35 | 0.35 |
| | $K_{33}/K_{11}$ | <0.80 | <0.80 | <0.75 |
| Electro-optical Characteristics | Contrast Ratio | 24 | 22 | 17 |
| | Viewing Angle Characteristic | 1.07 | 1.06 | 1.05 |
| | Response Speed [msec] | ≈30 | >30 | ≈25 |
| | Threshold Voltage [V] | 5.0 | 4.5 | 4.4 |

The contrast ratios in Examples 1 to 9 are as very high as 17 or more. Of the above examples, the value of Δn·n in Example 1 is 1.12 which is substantially equal to that of the conventional liquid crystal display device. However, the values of dielectric ratio $\Delta\epsilon/\epsilon_\perp$ and elastic constant ratio $K_{33}/K_{11}$ are as very small as 0.35 and 0.80 or less, respectively. For this reason, the device of Example 1 has a very high contrast.

According to Examples 2 to 9, the viewing angle characteristics are 1.07 or less, i.e., the viewing angles are wide, and the response speeds are about 30 msec or less to realize high-speed response. Therefore, these examples satisfy all the three characteristics which have been considered difficult to satisfy simultaneously. Especially, since liquid crystal layer thicknesses d of Examples 2 to 4 are 6 μm or less, their response speeds are very high. Therefore, Examples 2 to 4 are optimal as a liquid crystal display device for displaying a motion picture such as a television image. In addition, the values of Δn·d and elastic constant ratio $K_{33}/K_{11}$ of Examples 2 to 4 substantially equal each other. In this case, the contrast is improved in an example having smaller dielectric ratio $\Delta\epsilon/\epsilon_\perp$. Therefore, smaller dielectric ratio $\Delta\epsilon/\epsilon_\perp$ is preferable.

The device of Example 5 has smallest dielectric ratio $\Delta\epsilon/\epsilon_\perp$ and elastic constant ratio $K_{33}/K_{11}$ and very good contrast and viewing angle characteristic. Therefore, in order to improve the contrast and viewing angle characteristic, it is preferable to minimize dielectric ratio $\Delta\epsilon/\epsilon_\perp$ and elastic constant ratio $K_{33}/K_{11}$.

The liquid crystal display devices according to Examples 1 to 9 have excellent characteristics. However, as indicated by Example 9, although the response speed and viewing angle characteristic can be improved when Δn·d is reduced even if the liquid crystal composition similar to that of Example 4 was used, the contrast is reduced. In addition, as shown in Example 7, when Δn·d exceeds 0.7, the response speed and viewing angle characteristic are degraded. Therefore, in order to obtain a high response speed and a wide viewing angle, it is preferable to set Δn·d to be 0.54 to 0.70.

In this case, when optical anisotropy Δn is increased, the viewing angle characteristic is degraded. Therefore, in order to obtain a liquid crystal display device having a wider viewing angle, optical anisotropy Δn is preferably 0.14 or less as shown in Example 2. As can be seen from Examples 6 and 8 in which the same liquid crystal composition was used and liquid crystal layer thicknesses d were set to be 7.0 μm and 8.0 μm, respectively, the device of Example 8 has a large layer thickness of 8 μm. Therefore, the response speed of the device of Example 8 is lower than 30 msec, and its viewing angle characteristic is degraded. Therefore, in order to obtain response speed of 30 msec required for displaying a motion picture such as a television image, the liquid crystal layer thickness is preferably 7.0 μm or less.

The devices of Examples 1 to 9 are superior in various electrooptical characteristics, but their threshold voltages are relatively high. This is because in order to reduce dielectric ratio $\Delta\epsilon/\epsilon_\perp$ to be 0.5 or less, the value of Δε of the composition can be increased to at most 3 because the value of $\epsilon_{195}$ of a liquid crystal compound which is normally used is 3 to 5. Therefore, as represented by equation (IV), threshold voltage $V_C$ is increased when Δε is reduced. High threshold voltage $V_C$ increases a voltage of a drive signal for driving the liquid crystal display device. However, the drive signal can be arbitrarily set by a driver. For example, assuming that the device is driven by an optimal bias using a drive signal of 1/64 duty, the voltage of the drive signal is set to be 24 V when the threshold voltage is 4.0 V as in Example 2, it is set to be 27 V when the threshold voltage is 4.5 V as in Examples 4, 6, and 8, it is set to be 33 V when the threshold voltage is 5 V as in Example 7, and it is set to be 33 V when the threshold voltage is 5.5 V as in Example 3. As described above, the value of permittivity anisotropy Δε is less than 3 and preferably falls within the range of 0.5 to 1.5, and more preferably, 0.8 to 1.2.

As described above, the liquid crystal display device of the present invention employs a liquid crystal composition having small elastic constant ratio $K_{33}/K_{11}$ and $\Delta\epsilon/\epsilon_\perp$. Examples of the liquid crystal composition (in % by weight) having these characteristics are listed in Table 2. In Table 2, R and R' represent an alkyl group. Note that Examples 1 to 7 use liquid crystal compositions of corresponding numbers in Table 2, respectively. Examples 8 and 9 use liquid crystal compositions of No. 6 and No. 4, respectively.

TABLE 2

| Composition | Composition No. | | | | | | |
|---|---|---|---|---|---|---|---|
| | 1 | 2 | 3 | 4 | 5 | 6 | 7 |
| Np Liquid Crystal Compound | | | | | | | |
| 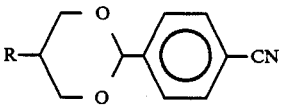 | — | — | 2 | 2 | — | — | 2 |
| 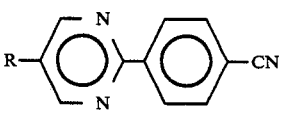 | — | 2 | — | — | 1 | — | — |
| 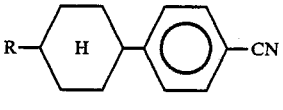 | 2 | — | — | — | — | 4 | — |
|  | 2 | — | — | — | — | — | — |
| Nn Liquid Crystal Compound | | | | | | | |
| 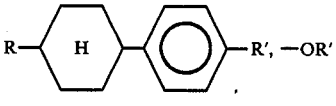 | 30 | 16 | 37 | 27 | 24 | — | 23 |
| 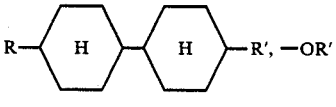 | | | | | | 34. | |
| 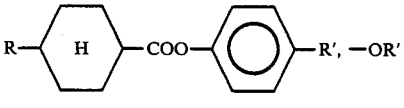 | 15 | 25.5 | — | — | 15 | 40 | 15 |

TABLE 2-continued

| Composition | 1 | 2 | 3 | 4 | 5 | 6 | 7 |
|---|---|---|---|---|---|---|---|
| R—(H)—(○)—(○)—R' | — | — | 10 | 5 | 8 | — | — |
| R—(H)—(H)—(○)—R' | — | 4 | — | — | — | — | — |
| R—(H)—(H)—COO—(○)—R' | — | — | 18 | — | 16 | 10 | 12 |
| R—(○)—C≡C—(○)—R', —OR' | 29 | 4.5 | — | — | — | — | — |
| R—(H)—(○)—C≡C—(○)—R' | 10 | — | — | — | — | — | — |
| R—(H)—(H)—CH$_2$CH$_2$—(○)—R' | — | — | — | 27 | — | — | 12 |
| R—(○N=N○)—(○)—R', —OR' | 12 | 48 | 33 | 39 | 36 | 12 | 36 |

| Characteristics | | | | | | | |
|---|---|---|---|---|---|---|---|
| m · p (°C.) | <−20° | <−20° | <−40° | <−30° | <−20° | <−20° | <−40° |
| c · p (°C.) | >55° | >55° | <61° | 57° | >55° | >55° | 55° |
| $\Delta n$ | 0.160 | 0.140 | 0.120 | 0.112 | 0.112 | 0.080 | 0.100 |
| $\Delta \epsilon$ | 1.05 | 1.48 | 1.18 | 0.93 | 0.60 | 1.04 | 0.80 |
| Viscosity (cp) | 21 | 24 | 24 | 24 | 26 | 22 | 22 |
| $\Delta \epsilon / \epsilon_\perp$ | 0.35 | 0.50 | 0.40 | 0.35 | 0.20 | 0.35 | 0.25 |
| $K_{33}/K_{11}$ | 0.8 or less | 0.75 or less | 0.75 or less | 0.75 or less | 0.7 or less | 0.8 or less | 0.80 or less |

In the liquid crystal compositions listed in Table 2, a mixing ratio of an Np liquid crystal compound having a positive dielectric anisotropy is reduced to reduce dielectric ratio $\Delta \epsilon / \epsilon_{195}$, and that of a pyrimidine liquid crystal compound having small elastic constant ratio $K_{33}/K_{11}$ is increased to reduce elastic constant ratio $K_{33}/K_{11}$ of the liquid crystal compositions. That is, these liquid crystal compositions were prepared by mixing a small amount of a liquid crystal compound having positive and relatively large dielectric anisotropy $\Delta \epsilon$ e.g., an Np liquid crystal compound having a cyano group at its terminal end in a mixture containing an Nn liquid crystal compound in which dielectric anisotropy $\Delta \epsilon$ is negative or substantially 0. As the Nn liquid crystal, a relatively large amount of a pyrimidine liquid crystal compound having small elastic constant ratio $K_{33}/K_{11}$ was used, and a low-viscosity liquid crystal, a high-temperature liquid crystal, and the like were mixed in addition to the compound. The values of dielectric ratio $\Delta \epsilon / \epsilon_\perp$ and elastic constant ratio $K_{33}/K_{11}$ of the liquid crystal compositions prepared as described above were 0.5 or less and 0.8 or less, respectively. Note that since a large amount of the high-viscosity pyrimidine compound was mixed in the liquid crystal compositions shown in Table 2, the viscosity values are larger than 20 cp. However, in the liquid crystal display device of the present invention, the response speed is not much reduced by an increase in viscosity because liquid crystal layer thickness d is relatively small.

Comparative examples for the examples of the present invention are listed in Table 3 below. In Table 3, definitions of measuring conditions and characteristics are the same as those in Table 1.

TABLE 3

| | Comparative Example No. | | | | | |
|---|---|---|---|---|---|---|
| | a | b | c | d | e | f |
| Device Constituent Factors | | | | | | |
| $\Delta n$ | 0.144 | 0.130 | 0.160 | 0.187 | 0.100 | 0.120 |
| d [μm] | 7.0 | 8.5 | 7.5 | 7.5 | 6.0 | 5.0 |
| $\Delta n \cdot d$ | 1.00 | 1.10 | 1.20 | 1.40 | 0.60 | 0.60 |
| Viscosity (cp) | <20 | ← | ← | ← | ← | ← |
| Electroptical | | | | | | |

TABLE 3-continued

|  | Comparative Example No. | | | | | |
| --- | --- | --- | --- | --- | --- | --- |
|  | a | b | c | d | e | f |
| Characteristics | | | | | | |
| Contrast Ratio | 10 | 14 | 13 | 12 | 6 | 4 |
| Viewing Angle Characteristic | 1.17 | 1.16 | 1.20 | 1.23 | 1.09 | 1.10 |
| Response Speed [msec] | >25 | >30 | >25 | >25 | >25 | >20 |
| Threshold Voltage [V] | ≈2.2 | ← | ← | ← | ← | ← |

Figure 6:
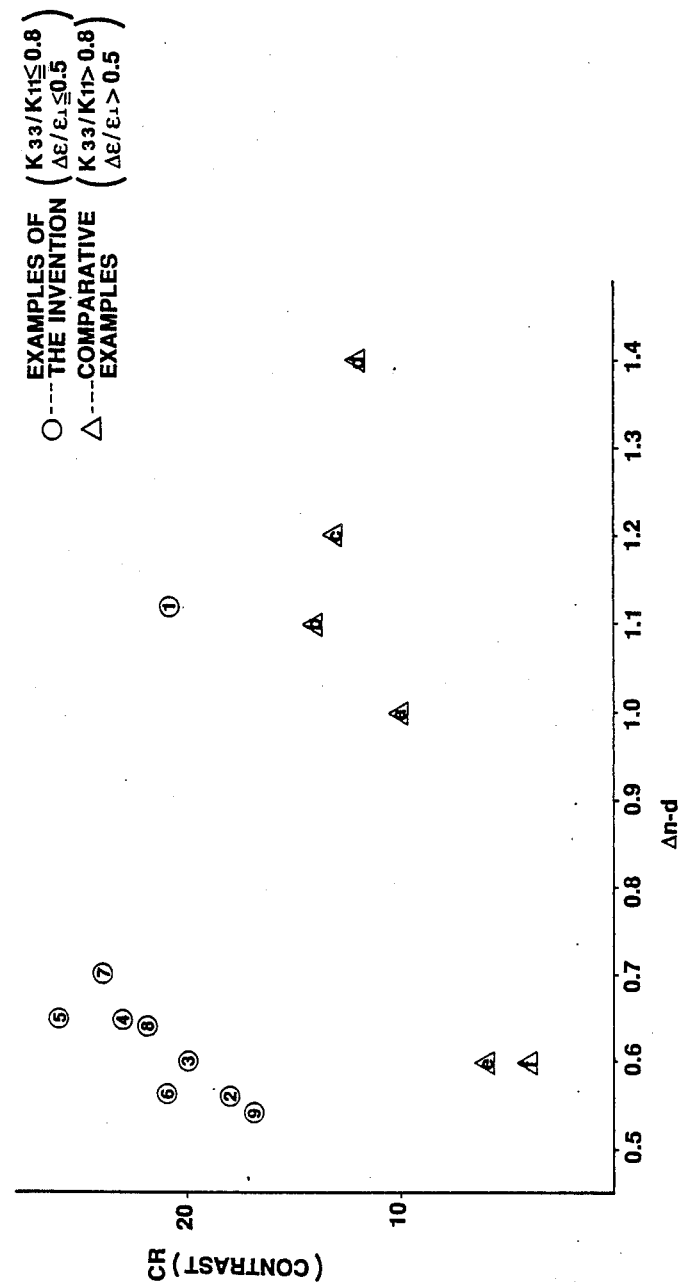
FIG. 6 is a chart showing a relationship of contrast with respect to Δn·d of examples of the present invention and comparative examples.

FIG. 6 shows values of the contrast with respect to values of $\Delta n \cdot d$ in Examples 1 to 9 of the present invention and Comparative Examples a to f. In FIG. 6, the abscissa represents the values of $\Delta n \cdot d$, and the ordinate represents the values of contrast (CR), thereby plotting the values of Examples 1 to 9 shown in Table 1 and those of Comparative Examples a to f. In FIG. 6, symbols o represent the examples of the present invention, and symbols Δ represent the comparative examples.

As is apparent from FIG. 6, the values of contrast in Examples 1 to 9 of the present invention having dielectric ratio $\Delta\epsilon/\epsilon_\perp$ and elastic constant ratio $K_{33}/K_{11}$ of 0.5 or less and 0.8 or less, respectively, are much higher than those of the comparative examples. Especially when Example 1 in which the value of $\Delta n \cdot d$ is around 1.1 is compared with Comparative Example a and Example 3 in which the value of $\Delta n \cdot d$ is 0.6 is compared with Comparative Examples e and f, it is apparent that the contrast values in the examples according to the present invention are very high.

Of matrix TN. LC. devices according to Comparative Examples a to f listed in Table 3, the device according to Comparative Example b which satisfies condition (c) for improving the γ characteristic given by equation (I), i.e., $\Delta n \cdot d = 1.10$ has the highest contrast among the comparative examples. However, the response speed of this device is slow.

When the matrix TN. LC. device is used for motion display of, e.g., a television receiver, its response speed preferably corresponds to a response time of 30 msec or less. In order to obtain this response speed, liquid crystal layer thickness d must be reduced to enhance the electric field intensity in accordance with condition (g) for obtaining the desired response speed. For example, as indicated by Comparative Examples a, c, and d in Table 4, high response speeds are obtained with layer thickness d of 7.5 μm or less. In this case, optical anisotropy $\Delta n$ of the liquid crystal must be increased to be 0.147 or more.

Of comparative examples a to d, the device of comparative example a having smallest $\Delta n$ has a good viewing angle characteristic. Therefore, it is apparent that smaller $\Delta n \cdot d$ and $\Delta n$ are preferable as indicated by conditions (d) and (e) for improving the viewing angle characteristic. Therefore, a liquid crystal display device having large $\Delta n$ of 0.147 has a poor viewing angle characteristic.

When $\Delta n$ and $\Delta n \cdot d$ are reduced to improve the viewing angle and response characteristics, although these characteristics are improved, the contrast is significantly lowered as indicated by Comparative Examples e and f in Table 3.

As described above, of the matrix TN. LC. devices in Comparative Examples a to f, the device of Comparative Example a in which $\Delta n \cdot d = 1.1$ (μm) has the highest contrast. However, the response characteristic of this device is slow, and its $\Delta n \cdot d$ is relatively large, resulting in a poor viewing angle characteristic. When liquid crystal layer thickness d is reduced to improve the response characteristic, $\Delta n$ must be increased to be 0.147 or more to obtain a good contrast, and the viewing angle characteristic is further degraded because $\Delta n$ is large. When layer thickness d and $\Delta n$ are reduced to improve the viewing angle and response characteristics as in Comparative Examples e and f, the value of $\Delta n \cdot d$ is largely deviated from optimal value 1.1, and the contrast is significantly degraded. Therefore, Comparative Examples a to f do not satisfy all of the high contrast, wide viewing angle, and high response speed.

Physical characteristics of liquid crystals according to Comparative Examples a to f listed in Table 3 are obtained with liquid crystal compositions prepared by mixing the liquid crystal compounds shown in Table 4 with respective mixing ratios. Comparative Examples a to f use liquid crystal compositions represented by corresponding symbols. In Table 4, R and R″ represent an alkyl group, and R′ represents an alkyl group and an alkoxy group.

TABLE 4

| Liquid Crystal Compound No. | Mixing Ratio (wt %) | | | | | |
| --- | --- | --- | --- | --- | --- | --- |
|  | a | b | c | d | e | f |
| R—⟨H⟩—⟨O⟩—CN | 10 | 14 | 20 | 17 | 27 | 10 |
| R—⟨O⟩—⟨O⟩—CN | 18 | 14 | 5 | 8 | — | 17 |
| R—⟨H⟩—⟨O⟩—R′ | 36 | 36 | 39 | 25 | 22 | 32 |
| R—⟨H⟩—⟨H⟩—R′ | — | — | — | — | 12 | — |

TABLE 4-continued

| Liquid Crystal Compound No. | Mixing Ratio (wt %) | | | | | |
|---|---|---|---|---|---|---|
| | a | b | c | d | e | f |
| R—[H]—COO—[O]—R' | — | — | — | — | 15 | 15 |
| R—[O]—C≡C—[O]—R' | — | — | 20 | 40 | — | — |
| R—[H]—[O]—[O]—R'' | 36 | 16 | — | — | — | — |
| R—[H]—[H]—[O]—R'' | — | 20 | — | — | 24 | 26 |
| R—[H]—[O]—C≡C—[O]—R'' | — | — | 16 | 10 | — | — |

Values of Δε and viscosity of these liquid crystal compositions are about 10 and 20 cp or less (at a measuring temperature of 20° C.), respectively. Since the value of dielectric constant $\epsilon_\perp$ of the liquid crystal compound is generally about 3 to 5, the value of $\Delta\epsilon/\epsilon_\perp$ is 1 or more. A liquid crystal compound (e.g., pyrimidine liquid crystal compound) having small elastic constant ratio $K_{33}/K_{11}$ has high viscosity and poor phase miscibility with other components. As a result, the viscosity of a composition is increased, and a smectic phase is easily generated. Therefore, in a conventional liquid crystal composition, a mixing ratio of the above compound is small, and the value of elastic constant ratio $K_{33}/K_{11}$ is 1.2 to 1.3 or more.

As described above, the examples of the present invention provide better contrast, viewing angle characteristic, and response speed than those of the comparative examples. Of these examples, especially Examples 2 to 7 provide high response speeds and therefore are optimal for displaying a motion image such as a television image.

In the above examples, a liquid crystal display device having a twisting angle of about 90° is used. However, the present invention is not limited to the above examples but can be applied to a liquid crystal display device having a twisting angle smaller or larger than 90°.

As has been described above, the liquid crystal display device of the present invention having the improved electrooptical characteristics can be used in a display apparatus for displaying characters, numerals, and figures of computer peripheral equipment. For example, color filters of red, blue, and green are provided in correspondence to the column electrodes shown in FIGS. 2 and 3 so that one pixel is formed by three intersections of the column and row electrodes corresponding to the three colors, and a color data signal is applied to the column electrode of each color. As a result, the present invention can be applied to a color liquid crystal display apparatus capable of displaying pixels in full color.

We claim:

1. A liquid crystal display device, comprising:
a pair of opposing substrates;
a plurality of electrodes arranged on inner surfaces of said pair of opposing substrates so as to oppose each other;
aligning films, formed on the inner surfaces of said pair of opposing substrates on which said plurality of electrodes are formed, and oriented in a predetermined direction;
a nematic liquid crystal, interposed between said opposing electrodes formed on said pair of opposing substrates, and having a positive dielectric anisotropy and a value of a dielectric ratio $\Delta\epsilon/\epsilon_\perp$ of not less than 0.1 and not more than 0.5 which is a ratio of a dielectric anisotropy $\Delta\epsilon$ to dielectric constant in a direction perpendicular to a liquid crystal molecular axis direction, a value of an elastic constant ratio $K_{33}/K_{11}$ of not more than 0.8 which is a ratio of a bending elastic constant $K_{33}$ to a splay elastic constant $K_{11}$, and values of a liquid crystal layer thickness d and an optical anisotropy $\Delta n$ with which a value of a product $\Delta n \cdot d$ of the liquid crystal layer thickness d and the optical anisotropy $\Delta n$ becomes not less than 0.5 ($\mu$m) and not more than 0.7 ($\mu$m); and
a pair of polarizing plates arranged to sandwich said nematic liquid crystal.

2. A device according to claim 1, wherein the value of the dielectric ratio $\Delta\epsilon/\epsilon_\perp$ is not less than 0.2 and not more than 0.4.

3. A device according to claim 1, wherein said nematic liquid crystal has a value of the dielectric anisotropy $\Delta\epsilon$ of less than 3.

4. A device according to claim 3, wherein the value of the dielectric anisotropy is not less than 0.5 and not more than 1.5.

5. A device according to claim 1, wherein said nematic liquid crystal has a value of the elastic constant ratio $K_{33}/K_{11}$ of not less than 0.75.

6. A device according to claim 1, wherein said nematic liquid crystal has values of the optical anisotropy $\Delta n$ and the liquid crystal layer thickness d with which the value of the product $\Delta n \cdot d$ becomes not less than 0.54 and not more than 0.7.

7. A device according to claim 6, wherein the value of the product $\Delta n \cdot d$ is not more than 0.65.

8. A device according to claim 1, wherein said nematic liquid crystal has the value of the optical anisotropy $\Delta n$ of not less than 0.08 and not more than 0.14.

9. A device according to claim 8, wherein the value of the optical anisotropy $\Delta n$ is less than 0.12.

10. A device according to claim 1, wherein said nematic liquid crystal has the liquid crystal layer thickness d of not less than 4 $\mu$m and not more than 8 $\mu$m.

11. A device according to claim 10, wherein the liquid crystal layer thickness is not more than 7.0 $\mu$m.

12. A device according to claim 1, wherein said pair of polarizing plates are arranged such that polarizing axes of said pair of polarizing plates are parallel to each other and substantially perpendicular or parallel to an orienting direction of liquid crystal molecules adjacent to said aligning film formed on one of said pair of substrates.

13. A device according to claim 1, wherein said aligning films comprise a first aligning film formed on one of said substrates and oriented in one direction and a second aligning film formed on the other substrate and oriented in a direction substantially perpendicular to the orienting direction of said first aligning film, and twist liquid crystal molecules of the nematic liquid crystal interposed between said first and second aligning films 90° between said substrates.

14. A device according to claim 1, wherein said plurality of electrodes comprise a plurality of first electrodes parallelly arranged on and extending in a transverse direction on the inner surface of one of said pair of substrates and a plurality of second electrodes parallelly arranged on and extending in a longitudinal direction on the inner surface of the other substrate, thereby forming a plurality of pixels arranged in a matrix manner at portions at which said plurality of first electrodes cross said plurality of second electrodes through the nematic liquid crystal.

15. A device according to claim 14, further comprising:
driving means, connected to said plurality of first electrodes to supply a scanning signal thereto, and connected to said plurality of second electrodes to supply a data signal thereto, thereby driving said pixels in a multiplex manner.

16. A liquid crystal display device, comprising:
opposing first and second substrates;
a plurality of first electrodes substantially parallelly arranged on and extending in a first direction on an inner surface of said first substrate opposing said second substrate;
a plurality of second electrodes substantially parallelly arranged on and extending in a second direction perpendicular to the first extending direction of said first electrodes on an inner surface of said second substrate opposing said first substrate;
a first aligning film, covering surfaces of at least said first electrodes formed on said first substrate, and oriented in a first direction;
a second aligning film, covering surfaces of at least said second electrodes formed on said second substrate, and oriented in a second direction substantially 90° with respect to the first orienting direction of said first aligning film;
a nematic liquid crystal, interposed between said first and second substrates on which said first and second electrodes are formed, and having a positive dielectric anisotropy and a value of a dielectric ratio $\Delta\epsilon/\epsilon_\perp$ of not less than 0.1 and not more than 0.5 which is a ratio of a dielectric anisotropy $\Delta\epsilon$ to dielectric constant in a direction perpendicular to a liquid crystal molecular axis direction, a value of an elastic constant ratio $K_{33}/K_{11}$ of not more than 0.8 which is a ratio of a bending elastic constant $K_{33}$ to a splay elastic constant $K_{11}$, and values of a liquid crystal layer thickness d and an optical anisotropy $\Delta n$ with which a value of a product $\Delta n \cdot d$ of the liquid crystal layer thickness d and the optical anisotropy $\Delta n$ becomes not less than 0.5 ($\mu$m) and not more than 0.7 ($\mu$m);
a sealing member for sealing said nematic liquid crystal between said pair of substrates; and
a pair of polarizing plates arranged to sandwich said nematic liquid crystal so that polarizing axis directions of said pair of polarizing plates are parallel to each other.

17. A device according to claim 16, wherein said nematic liquid crystal has the value of the dielectric ratio $\Delta\epsilon/\epsilon_\perp$ of not less than 0.1 and not more than 0.5 and the values of the optical anisotropy $\Delta n$ and liquid crystal layer thickness d with which the value of the product $\Delta n \cdot d$ becomes not less than 0.54 and not more than 0.7.

18. A device according to claim 16, further comprising:
driving means, connected to said first electrodes to supply a scanning signal thereto, and connected to said second electrodes to supply a data signal thereto.

19. A liquid crystal display device for multiplex driving at a high duty, comprising:
a pair of opposing substrates;
a plurality of electrodes arranged on inner surfaces of said pair of opposing substrates so as to oppose each other, a plurality of pixels each arranged for multiplex driving and formed at mutually facing regions between the electrodes formed on the inner surface of one substrate and the electrodes formed on the inner surface of the other substrate;
aligning films, formed on the inner surfaces of said pair of opposing substrates on which said plurality of electrodes are formed, and oriented in a predetermined direction;
a nematic liquid crystal composition interposed between said opposing electrodes formed on said pair of opposing substrates, and having a positive dielectric anisotropy and a value of a dielectric ratio $\Delta\epsilon/\epsilon_\perp$ of not less than 0.1 and not more than 0.5 which is a ratio of a dielectric anisotropy $\Delta\epsilon$ to dielectric constant in a direction perpendicular to a liquid crystal molecular axis direction, a value of an elastic constant ratio $K_{33}/K_{11}$ of not more than 0.8 which is a ratio of a bending elastic constant $K_{33}$ to a splay elastic constant $K_{11}$, and values of a liquid crystal layer thickness d and an optical anisotropy Δn with which a value of a product Δn·d of the liquid crystal layer thickness d and the optical anisotropy Δn becomes not less than 0.5 (μm) and not more than 0.7 (μm); and a pair of polarizing plates arranged to sandwich said nematic liquid crystal composition.

* * * * *